United States Patent [19]
Johnson

[11] Patent Number: 4,692,135
[45] Date of Patent: Sep. 8, 1987

[54] SEALER FOR SIDE GUSSETED BAGS

[76] Inventor: James R. Johnson, 3819 Greenhill Dr., Chamblee, Ga. 30341

[21] Appl. No.: 849,054

[22] Filed: Apr. 7, 1986

[51] Int. Cl.$^4$ .......................... B31B 1/64; B31B 37/64
[52] U.S. Cl. .................................... 493/394; 493/193; 493/207; 493/209; 156/461; 156/515; 156/583.1
[58] Field of Search ............... 493/189, 394, 193, 206, 493/207, 209, 225, 226; 156/515, 583.1, 461, 200, 204

[56] References Cited

U.S. PATENT DOCUMENTS

| | | | |
|---|---|---|---|
| 3,395,622 | 8/1968 | Kugler | 493/196 |
| 3,853,664 | 12/1974 | La Fleur | 156/515 |
| 3,865,018 | 2/1975 | Gaffney | 493/196 |
| 4,430,069 | 2/1984 | Carlisle | 493/203 |
| 4,468,276 | 8/1984 | Membrino | 156/510 |

FOREIGN PATENT DOCUMENTS

| | | | |
|---|---|---|---|
| 883556 | 10/1971 | Canada | 493/189 |
| 7800295 | 4/1979 | Netherlands | 493/193 |

Primary Examiner—Frederick R. Schmidt
Assistant Examiner—William E. Terrell
Attorney, Agent, or Firm—James B. Middleton

[57] ABSTRACT

A sealer is disclosed for sealing upper and lower portions of a web without sealing the portions together, such as side gussets in side gusseted bags. A sealing bar is placed below the web and fixed with respect to the machine. Another sealing bar is placed above the web, parallel to the first one. An air cylinder can urge the upper sealing bar down against the lower one to seal the web. A platen is placed within the side gusset to prevent the portions from being sealed to each other, and the platen floats vertically to accommodate the motion of the sealing bars.

7 Claims, 3 Drawing Figures

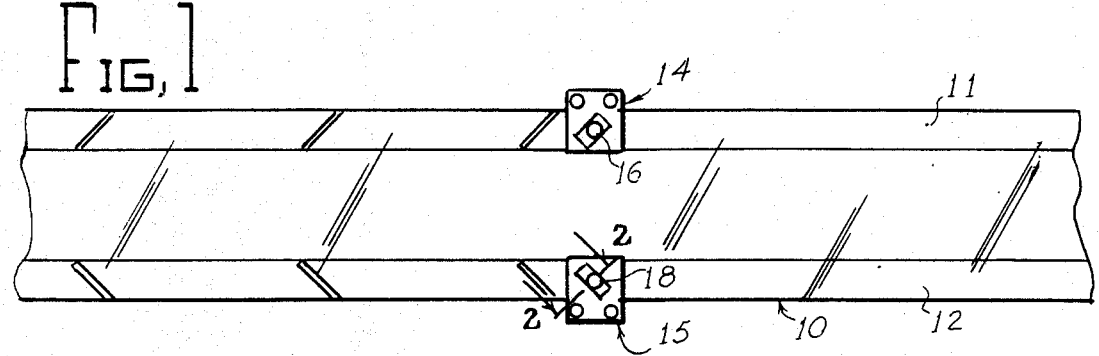
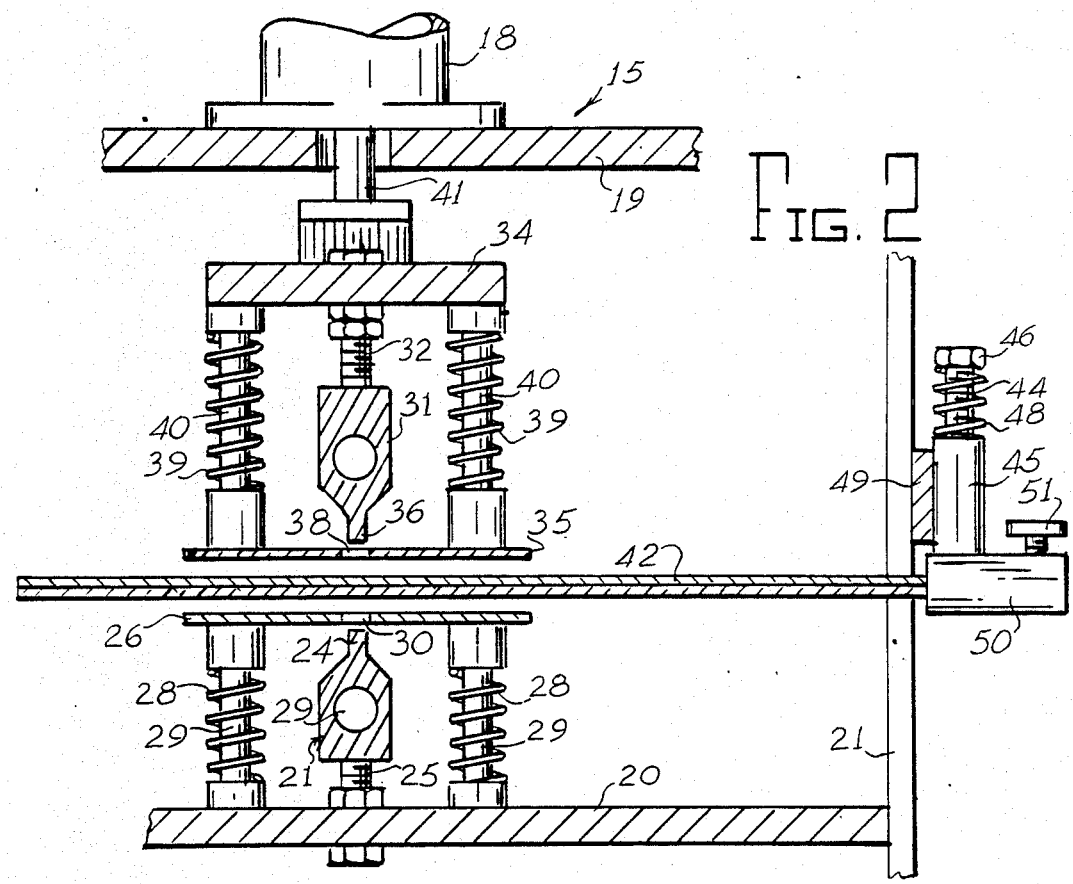
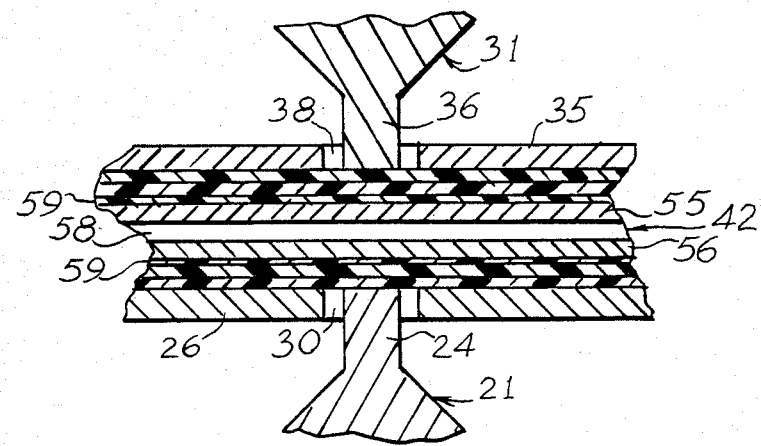

SEALER FOR SIDE GUSSETED BAGS

INFORMATION DISCLOSURE STATEMENT

There are several prior patents that disclose a side gusseted bag having angled seals in the side gussets, the angled seals being so arranged that the bag can open to have a flat bottom. One such bag is shown in the patent to La Fleur, U.S. Pat. No. 3,143,277. Both for this particular arrangement and for other constructions utilized in the converting industry, it is desirable to make seals in a moving web, the seals being angularly disposed with respect to the motion of the web.

In the conventional bag machine, the web will be moved one discrete length, and the web will be stopped. While the web is stopped, a heated bar is urged against the web. In a side gusseted bag, it will be understood that there must be a platen within the gusset, and heated bars must be disposed both above and below the moving web to seal both the upper and lower portions of the gusset. Furthermore, it will be understood that gussets on both sides of the bags must be sealed, so there will be four heated bars. With the mechanism for causing the appropriate motion, such an arrangement becomes quite burdensome and inefficient.

Other arrangements have been attempted to accomplish the angled seals, but the presence of upper and lower portions of the gussets, and the need to assure a complete seal in all portions renders the problem quite difficult, and other proposed solutions have not met with success.

SUMMARY OF THE INVENTION

This invention relates generally to a sealer for the converting industry, and is more particularly concerned with a dual opposed sealer with a floating platen between the sealing bars.

The present invention provides a dual sealer useable for providing angled seals in side gussets or the like, the dual sealer including a stationary sealing bar and a movable sealing bar parallel to the stationary sealing bar. A floating platen is disposed between the two sealing bars, and the arrangement is such that, as the movable sealing bar is urged towards the platen, the platen moves towards the stationary sealing bar, and the two sealing bars provide heat seals on both sides of the platen.

In the preferred embodiment, there is a spring-urged stripper plate for each of the sealing bars, the stripper plates being normally disposed beyond the sealing edge of the sealing bars, and movable for allowing the sealing edge to engage plastic film on the platen.

BRIEF DESCRIPTION OF THE DRAWINGS

These and other features and advantages of the present invention will become apparent from consideration of the following specification when taken in conjunction with the accompanying drawings in which:

FIG. 1 is a top plan view showing, rather schematically, two sealers made in accordance with the present invention in position for making angled seals on a plastic web;

FIG. 2 is an enlarged cross-sectional view taken substantially along the line 2—2 in FIG. 1; and, FIG. 3 is an enlarged fragmentary view showing the sealing bars engaging the plastic film on the platen.

DETAILED DESCRIPTION OF THE EMBODIMENT

Referring now more particularly to the drawings, and to that embodiment of the invention here presented by way of illustration, FIG. 1 shows a web generally indicated at 10 having side gussets indicated at 11 and 12. Those skilled in the art will understand that a tubular member will be flattened and fed along a path. As the tubular member, or web 10, traverses the path, the side gussets 11 and 12 will be folded by conventional means. After the gussets 11 and 12 are folded, the web 10 will be further fed along the path and the various seals, cuts and the like will be provided in order to create the desired bags. As a final step, individual bags will be separated from the web 10.

If the bags formed from the web 10 require individual seals in the side gussets 11 and 12, it will be understood that the separate folds of material must be held apart, and the upper portion and lower portion of the gussets must be sealed separately. While the simple angled seal is here shown by way of illustration, other forms of seal may involve the same problems, and the apparatus of the present invention would be used in generally the same manner.

Since the side gussets 11 and 12 must be individually sealed, it will be understood that there are two sealing devices indicated at 14 and 15. While the sealers 14 and 15 are not shown in detail in FIG. 1, it will be seen that there are fluid operated cylinders 16 and 18 to operate the sealing devices 14 and 15 respectively.

Looking also at FIG. 2 of the drawings, it will be understood by those skilled in the art that, in the converting industry, a conventional bag machine includes a basic framework, and various pieces of apparatus to operate on the web as the web passes through the bag machine are supported from this framework. Thus, while the precise support means is not here shown in detail, those skilled in the art will readily provide the necessary structure in the usual manner.

Looking at FIG. 2 in more detail, it will be seen that the fluid operated cylinder 18 is carried by a plate 19, and it should be understood that the plate 19 is stationary with respect to the frame of the bag machine. There is also a parallel plate 20 that is stationary with respect to the frame of the bag machine, the plate 20 being here shown as fixed to a vertical member 21.

The plate 20 supports a generally conventional heated sealing bar 21 having an opening 22 for receiving an electric heater, and including a sealing edge 24. As is conventional, the sealing edge 24 has a width equal to the width of the desired seal in the plastic material.

The sealing bar 21 is supported from the plate 20 by screws 25. Since the sealing bar 21 is here shown as viewed from its end, it will be understood that a plurality of screws 25 will be distributed along the length of the sealing bar 21 sufficient to support the bar and maintain the sealing edge 24 uniformly horizontal.

Generally at the upper end of the sealing bar 21 there is a lower stripper plate 26. The stripper plate 26 is carried by springs 28 surrounding posts 29. The posts 29 are, in turn, carried by the plate 20. The stripper plate 26 includes an opening 30 through which the sealing edge 24 of the sealing bar 21 can project.

There is a heated sealing bar 31 that is the mirror image of the sealing bar 21, the sealing bar 31 being carried from screws 32 which extend from a plate 34. There is an upper stripper plate 35 disposed at the end of the sealing bar 31 and arranged so the sealing edge 36 can project through the opening 38 in the stripper plate 35. The stripper plate 35 is carried by springs 39 which surround posts 40. The posts 40 extend from the plate 34.

It will now be seen that the fluid operated cylinder 18 has a piston rod 41 which carries the plate 34 at its extending end. Thus, when the piston rod 41 is projected, the plate 34 will be moved downwardly as shown in the drawings, and the sealing bar 31 will also be moved downwardly towards the sealing bar 21.

Between the two stripper plates 26 and 35, there is a floating platen 42. It will be seen in FIG. 2 that the platen 42 is disposed above the lower stripper plate 26 and below the upper stripper plate 35. The platen 42 is carried by vertically extending screw 44 which extends through a cylinder 45. A stop nut 46 confines a spring 48 between the stop nut 46 and the cylinder 45. The cylinder 45 is fixed to the cross bar 49 so that the cylinder 45 is fixed with respect to the frame of the bag machine.

The right-hand edge of the platen 42, as shown in FIG. 2, is carried within a housing 50. A set screw 51 is threadedly received by the housing 50, and engages the platen 42. It will therefore be understood that rotation of the set screw 51 will cause the platen 42 to move downwardly with respect to the housing 50. This provides some vertical adjustment for the platen 42 with respect to the stripper plates 26 and 35. Regardless of the position of the set screw 51, however, it will be understood that a force downwardly on the platen 42 will cause the spring 48 to compress and allow the entire housing 50 and the platen 42 to move down.

It should now be understood that the platen 42 will be so sized and located as to be received within the gusset 12, and a similar platen will be received within the gusset 11. As shown in FIG. 2, there will be a double thickness of plastic material between the platen 42 and the stripper plate 26, and a double thickness of plastic material between the stripper plate 35 and the platen 42. When a seal is to be made, the motion of the web 10 will be stopped, and fluid under pressure will cause the projection of the piston rod 41, which will cause the plate 34 to move downwardly and carry the sealing bar 31. As the stripper plate 35 engages the plastic material, the stripper plate 35 will tend to move upwardly with respect to the sealing bar 31 so the sealing edge 36 will project through the slot 38 in the stripper plate 35. Continued motion of the piston rod 41 will cause the platen 42 to move downwardly and engage the stripper plate 26. Motion will continue, and the stripper plate 26 will move downwardly, causing the sealing edge 24 of the sealing bar 21 to project through the opening 30 in the stripper plate 26. It will therefore be understood that, on full motion of the piston rod 41, the sealing edge 36 will engage the upper side of the gusset 12, and the sealing edge 24 of the sealing bar 21 will engage the lower side of the gusset. Reversal of the cylinder 18 will return the parts to the positions shown in FIG. 2, and the web 10 will again be moved along the path through the bag machine.

Attention is next directed to FIG. 3 of the drawings FIG. 3 shows the parts described above in their sealing positions. It will also be seen in FIG. 3 that the movable platen 42 is made up of a pair of parallel plates 55 and 56 having a space 58 therebetween. Also, the upper and lower surfaces of the platen 42 have a coating 59 to prevent the bag material 10 from sticking to the platen 42. Preferably, the coating 59 will be a high temperature, nonstick material such as polytetraflouroethylene (PTFE). There is commercially available a PTFE-impregnated fabric that is highly durable and operates successfully as the coating 59.

With the space 58 between the two plates 55 and 56, it will be understood that there can be some air circulation to assist in cooling the platen 42. Obviously, if cooling becomes a great problem, fluid flow can be forced between the plates 55 and 56 to achieve the desired degree of cooling.

It will therefore be seen that the present invention provides an extremely simple sealing apparatus for upper and lower portions of a film, to seal the portions separately without sealing them together. While the embodiment of the invention here presented shows straight seals angularly disposed in side gussets, those skilled in the art will understand that any shape of sealing edge may be used, and virtually any disposition of the sealing means with respect to the web 10 can be utilized depending on the particular seal needed. In any event, the movable, or floating, platen 42 requires only a very small separation of the portions of the web, and a single fluid operated cylinder or the like is needed for each sealing device, rendering the device simple and efficient, and easy to maintain.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or the scope of the invention as outlined in the appended claims.

I claim:

1. In converting apparatus wherein a web traverses a path and actions are performed on said web as said web traverses said path, said web having an upper portion and a lower portion which are to receive actions separately, said converting apparatus including a dual sealer for sealing said upper portion and said lower portion simultaneously, said dual sealer including a first sealing bar disposed on a first side of said web and fixed with respect to said converting apparatus, a second sealing bar parallel to said first sealing bar and disposed on the opposite side of said web, and means for moving said second sealing bar towards said first sealing bar for sealing said web therebetween, and platen means between said upper portion and said lower portion of said web to maintain such portions separate, said platen means being disposed between said first sealing bar and said second sealing bar so that said upper portion of said web is sealed between said second sealing bar and said platen means and said lower portion of said web is sealed between said first sealing bar and said platen means, said platen means being movable towards and away from said first sealing bar.

2. In converting apparatus as claimed in claim 1, said dual sealer further including a first stripper plate adjacent to said first sealing bar, said first sealing bar including a sealing edge for engaging and sealing said web, first resilient means for normally urging said first stripper plate beyond said sealing edge of said first sealing bar, a second stripper plate adjacent to said second sealing bar, said second sealing bar including a sealing edge for engaging and sealing said web, second resilient means for normally urging said second stripper plate beyond said sealing edge of said second sealing bar.

3. In converting apparatus as claimed in claim 2, said first stripper plate defining an opening therein for receiving said sealing edge of said first sealing bar therethrough, said second stripper plate defining an opening therein for receiving said sealing edge of said second sealing bar therethrough.

4. In converting apparatus as claimed in claim 3, mounting means for said platen means for allowing said platen means to float while remaining generally parallel to said web for moving towards and away from said first sealing bar.

5. In converting apparatus as claimed in claim 4, said platen including a coating thereon for preventing adhesion of said web to said platen.

6. In converting apparatus as claimed in claim 5, said coating including polytetraflouroethylene.

7. In converting apparatus as claimed in claim 5, said means for moving said second sealing bar towards said first sealing bar including a fluid operated cylinder having a piston rod, a plate carried on said piston rod, said second sealing bar being mounted on said plate, said second stripper plate being mounted on said plate, said second resilient means including a plurality of springs between said second stripper plate and said plate, the arrangement being such that projection of said piston rod will move said second sealing bar towards said first sealing bar, said stripper plates will move to allow said sealing edges to project therethrough and said sealing edges will seal said web.

* * * * *